United States Patent
Jeong

(10) Patent No.: US 6,658,141 B1
(45) Date of Patent: Dec. 2, 2003

(54) FILTERING METHOD AND APPARATUS FOR IMPROVING RESOLUTION OF ULTRASOUND IMAGE

(75) Inventor: Mok Kun Jeong, Kyunggi-do (KR)

(73) Assignee: Medison Co., Ltd. (KR)

( * ) Notice: Subject to any disclaimer, the term of this patent is extended or adjusted under 35 U.S.C. 154(b) by 0 days.

(21) Appl. No.: 09/511,868

(22) Filed: Feb. 25, 2000

(51) Int. Cl.[7] ................................................. G06K 9/00
(52) U.S. Cl. ....................................... 382/128; 382/260
(58) Field of Search ................................ 382/128, 255, 382/260, 280; 128/922; 73/703; 600/437, 441, 443, 447

(56) References Cited

U.S. PATENT DOCUMENTS

| | | | | |
|---|---|---|---|---|
| 5,186,177 A | * | 2/1993 | O'Donnell et al. | 600/463 |
| 6,014,897 A | * | 1/2000 | Mo | 73/628 |
| 6,066,099 A | * | 5/2000 | Thomenius et al. | 600/447 |
| 6,432,056 B1 | * | 8/2002 | Cooley et al. | 600/443 |

OTHER PUBLICATIONS

Mok Kun Jeong, "A Study of Sidelobe Reduction Based on FFT in Ultrasound Images," Journal of Korean Sound Society, pp. 40–47, Feb. 1999.

* cited by examiner

Primary Examiner—Leo Boudreau
Assistant Examiner—Ryan J. Miller
(74) Attorney, Agent, or Firm—F. Chau & Associates, LLP

(57) ABSTRACT

A filtering method and apparatus improve resolution of an ultrasound image in an ultrasound imaging system. The filtering method includes the steps of obtaining magnitude of at least one lateral direction signal component among ultrasound filed characteristics which lowers resolution of an image, using Fourier transform, and scaling a signal focused in a mainlobe direction according to a ratio between the magnitude of the obtained lateral direction signal component and that of the signal focused in the mainlobe direction. The filtering apparatus includes a lateral direction signal calculator and a filtering unit.

18 Claims, 6 Drawing Sheets

FILTERING METHOD AND APPARATUS FOR IMPROVING RESOLUTION OF ULTRASOUND IMAGE

BACKGROUND OF THE INVENTION

1. Field of the Invention

The present invention relates to a filtering method and apparatus for improving resolution of an ultrasound image in an ultrasound imaging system, and more particularly, to a filtering method and apparatus for efficiently minimizing influences of signal components corresponding to lateral direction ultrasound field characteristics included in a signal of a mainlobe direction corresponding to an image point.

2. Description of the Related Art

Transmission and reception ultrasound field characteristics in an ultrasound image are determined by a transducer, an ultrasound frequency, and an ultrasound focusing system employed in an ultrasound imaging system. Here, the width of a mainlobe, the magnitude of a sidelobe, and a gratinglobe in an ultrasound field determine resolution of an image. In general, a focusing system is widely used in order to increase resolution of an ultrasound image. In case of receive focusing, in particular, dynamic receive focusing is used. As a result, maximum resolution restricted by diffraction can be obtained at all image depths. In case of transmission focusing, since the transmission focusing is possible only with respect to a single image point, resolution of an ultrasound image varies according to the depth of an image.

In order to improve resolution of the ultrasound image, there have been proposed various signal processing methods. In general, apodization is used to decrease a sidelobe, which increases however the width of a mainlobe to accordingly lower a resolution. In addition to the performance of the focusing system, attenuation, refraction and reflection in a human body lower the ultrasound field characteristics of an ultrasound image when the ultrasound image travels inside an object, that is, the human body. The change of the ultrasound field characteristics is decreased using a deconvolution filter, to thereby compensate for the ultrasound field characteristics which lower according to the depth of an image point. However, this method has a problem that the pattern of the traveling ultrasound field should be accurately understood. Recently, there have been proposed adaptive filters for compensating for a phase aberration due to non-ouniformity of an ultrasound velocity, in which all factors lowering resolution in a medium are modeled by velocity non-uniformity, to thereby calculate a signal delay of each reception element and adjust a focusing delay time of a focusing system according to the calculated signal delay to improve resolution. O'Donnell et al. (U.S. Pat. No. 5,186, 177) have proposed a filter considering ultrasound field characteristics by applying phase aberration correction to a human body image. By this method, lowering of ultrasound field characteristics have been compensated for by scaling an image value according to the magnitudes of all signals in any directions. This method has been applied to a human body resulting in a good result, which has however raised a problem of increasing an amount of calculation according to an increase in iteration.

SUMMARY OF THE INVENTION

To solve the above problems, it is an object of the present invention to provide a filtering method for remarkably improving resolution of an ultrasound image by efficiently minimizing an influence of lateral direction signal component which lowers resolution of the ultrasound image among ultrasound field characteristics.

It is another object of the present invention to provide an apparatus adopting the above filtering method.

To accomplish the above object of the present invention, there is provided a filtering method for improving resolution of an ultrasound image in an ultrasound imaging system, the filtering method comprising the steps of: (a) obtaining magnitude of at least one lateral direction signal component among ultrasound field characteristics which lower resolution of an image, using Fourier transform; and (b) scaling a signal focused in a mainlobe direction according to a ratio between the magnitude of the obtained lateral direction signal component and that of the signal focused in the mainlobe direction.

There is also provided a filtering apparatus for improving resolution of an ultrasound image in an ultrasound imaging system, the filtering apparatus comprising: a lateral direction signal calculator for obtaining magnitude of at least one lateral direction signal component among ultrasound field characteristics which lower resolution of an image, using Fourier transform; and a filtering unit for scaling a signal focused in a mainlobe direction according to a ratio between the magnitude of the lateral direction signal component obtained in the lateral direction signal calculator and that of the signal focused in the mainlobe direction.

Here, the signal components corresponding to the lateral direction sound field characteristics which are considered in the filtering method and apparatus are at least one of the lateral direction signal components each corresponding to a sidelobe direction, a null direction and a gratinglobe direction, on the basis of a mainlobe direction corresponding to an image point. In more detail, it is preferable that the signal component corresponding to the direction of $\sin(\theta_s)$ $\approx \pm(n+0.5)\lambda/D$, the signal component corresponding to a null direction is the lateral direction signal component corresponding to the direction of $\sin(\theta_n) = \pm n\lambda/D$ and the signal component corresponding to a gratinglobe direction is the lateral direction signal component corresponding to the direction of $\sin(\theta_g) = \lambda/d$. Here, n is a positive integer, $\lambda$ is the wavelength of an ultrasound, D is the whole size of an array transducer, and d is the size of one element of the array transducer.

BRIEF DESCRIPTION OF THE DRAWINGS

The above objects and other advantages of the present invention will become more apparent by describing the preferred embodiment thereof in more detail with reference to the accompanying drawings in which.

DETAILED DESCRIPTION OF THE PREFERRED EMBODIMENT

A preferred embodiment of the present invention will be described with reference to the accompanying drawings.

First, a theoretical model of an ultrasound imaging system relating to the present invention will be described below. In general, an ultrasound imaging system uses an array transducer to receive a signal returning from an image point in each transducer. Here, since a distance between the image point and a receipt element differs from each other, an ultrasound signal reflected from the image point at the same time reaches each receipt element at a different time. Thus, if a time difference according to the difference of the traveling distance is compensated for in the ultrasound imaging system, phase of each signal is aligned identically as if each channel signal reaches the receipt element at the same time. If an aligned signal corresponding to each receipt element is added to each other, the added result becomes larger in magnitude than an original signal having reached a receipt element. The focusing method maximizes the magnitude of the signal returning from the image point and attenuates or weakens those of the signals returning from the other points.

Figure 1:
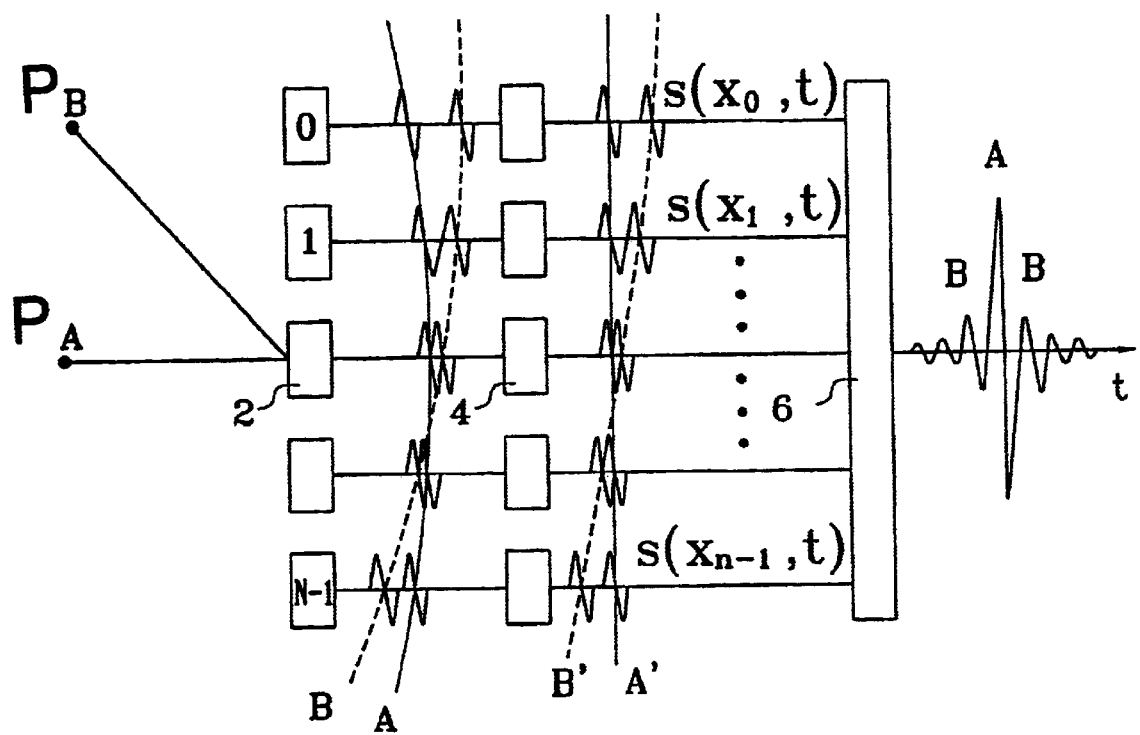
FIG. 1 is a view for explaining a receive focusing operation of a reflective signal by a mainlobe and a sidelobe among ultrasound field characteristics.

FIG. 1 is a view for explaining a receive focusing operation of a reflective signal by a mainlobe and a sidelobe among ultrasound field characteristics. A signal having reached a transducer, that is, an array element 2 has been amplified in an amplifier (not shown). Then, a focusing delay unit 4 applies a delay time necessary for focusing to the amplified signal. If the focusing delay time is applied, a signal returning from a point $P_A$ corresponding to an image point, that is, a mainlobe signal of a wave form A is aligned so that the phases thereof are identical to each other as if the signal has reached all reception channels simultaneously (wave form A'). However, a signal (wave form B) returning from a point $P_B$ which is located in the sidelobe direction is placed on a respectively different time axis by each channel even after a focusing delay time has been applied (wave form B'). Since the sidelobe direction signal (wave form B') is out of phase in each channel, some are offset and the others are not offset when a signal of each channel is added in a summing unit 6. Therefore, the remaining sidelobe signal is added to the mainlobe signal to thereby lower resolution of the ultrasound image. Thus, if the influence of the sidelobe signal added to the mainlobe signal is minimized, contrast of the ultrasound image can be enhanced.

Figure 2:
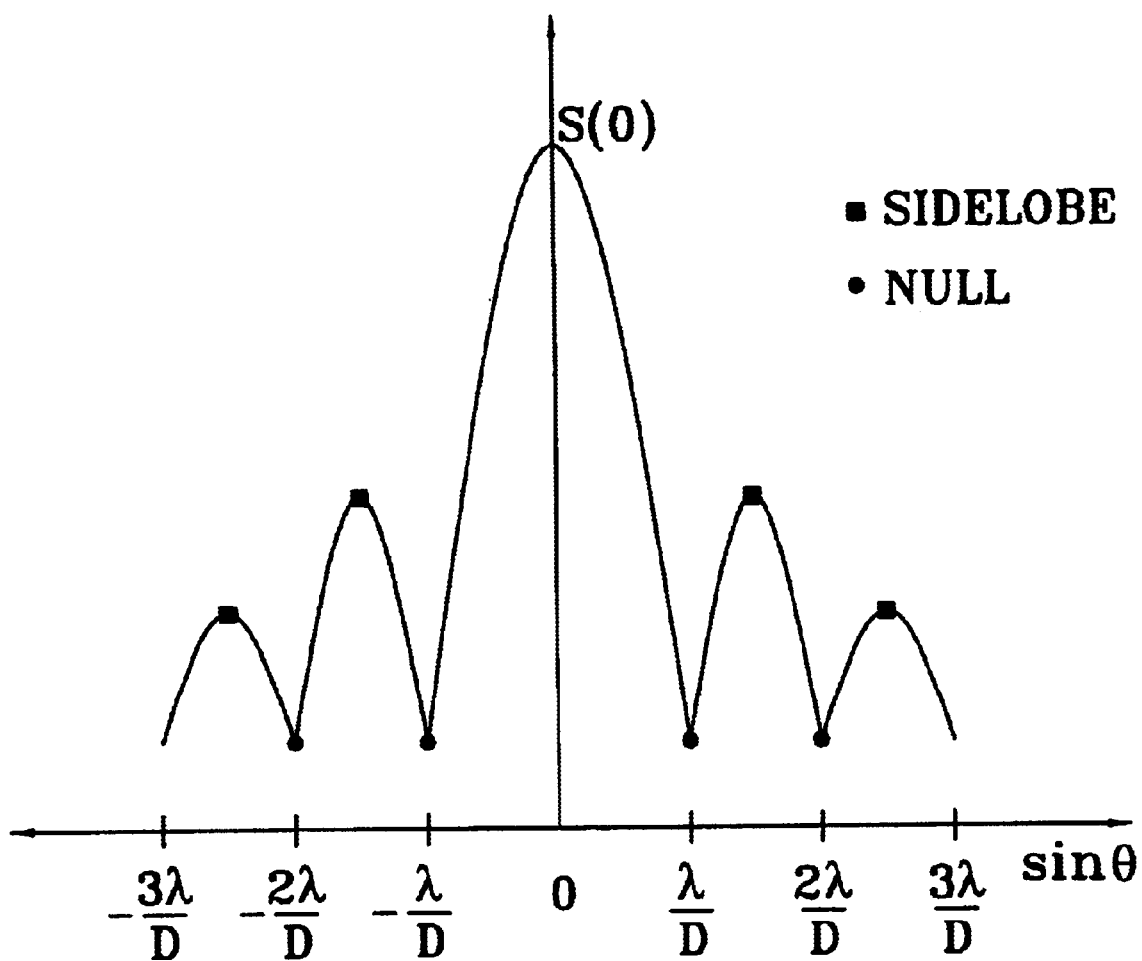
FIG. 2 is a view showing lateral direction ultrasound field characteristics with respect to a steering angle in the case of a successive wave in a linear array transducer having a magnitude of D.

FIG. 2 is a view showing lateral direction ultrasound field characteristics with respect to a steering angle in the case of a successive wave in a linear array transducer having a magnitude of D. The ultrasound field characteristics with respect to a steering angle in a general phased array system is expressed by Fourier transform corresponding to shape of a transducer. In the case of a transducer having a rectangular aperture, the ultrasound field characteristics are expressed as a sine function, which represents a sensitivity with respect to each lateral direction signal. Thus, referring to FIG. 2, the magnitude of a signal corresponding to the mainlobe direction (θ=0) having the strongest sound field is the largest. A sidelobe signal appears at an angle adjacent to the mainlobe, that is, $(\theta_s) \approx \pm(n+0.5)\lambda/D$, and a null point having the weakest sound field appears at an angle $\sin(\theta_n)=\pm n\lambda/D$. Further, gratinglobe signal appears at an angle $\sin(\theta_g)=\lambda/d$. Here, n is a positive integer, λ is the wavelength of an ultrasound, D is the whole size of an array transducer, and d is the size of one array element.

Figure 3:
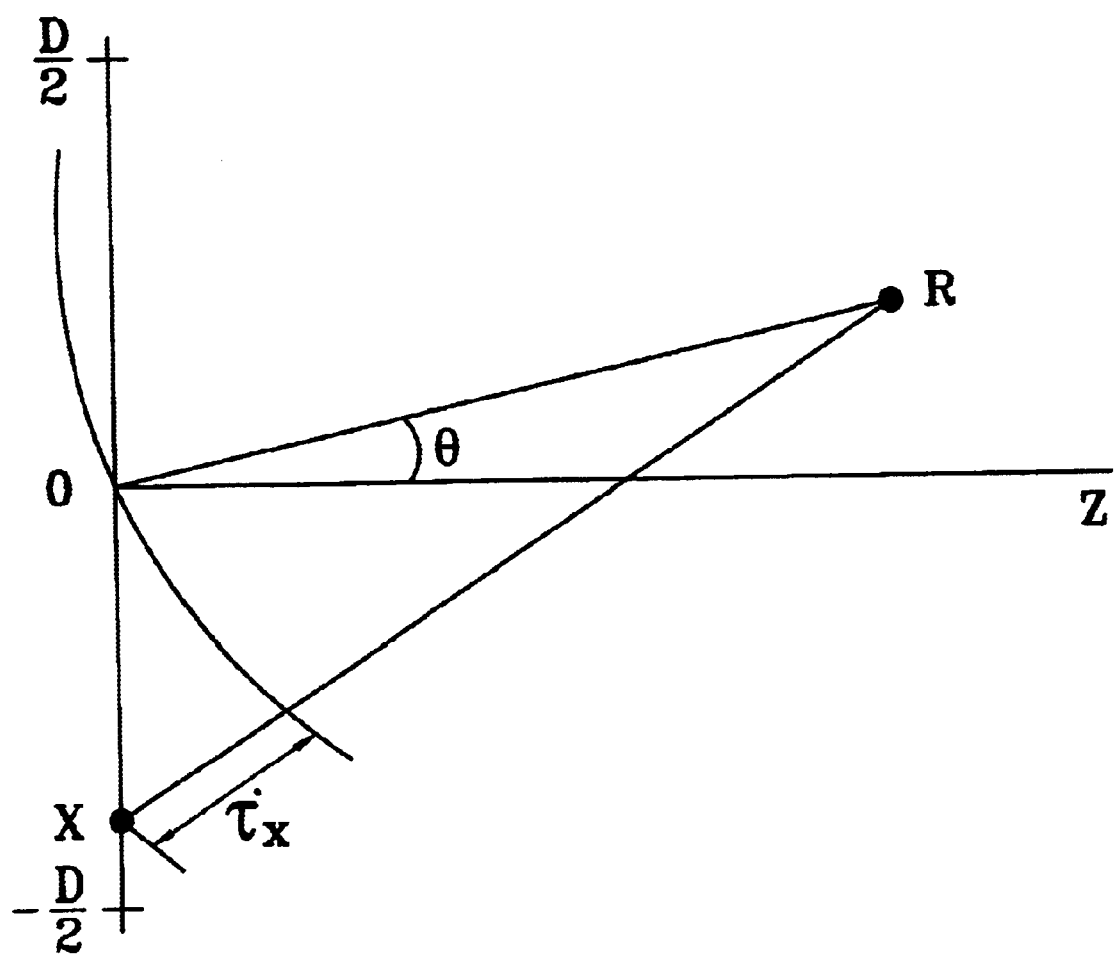
FIG. 3 shows a model for calculating a steering delay time of an ultrasound field in a phase array transducer.

This focusing method is applied to even the case where a scanning line is steered by an angle θ. The focusing delay and steering delay which is considered in this case are expressed as the following equation (1) with reference to FIG. 3.

$$\tau_x = \frac{R}{c}\left[\left\{1 + \left(\frac{x}{R}\right)^2 - 2\left(\frac{x}{R}\right)\sin\theta\right\}^{\frac{1}{2}} - 1\right] + t_0 \quad (1)$$

Here, c denotes an ultrasound velocity, x denotes a distance from the center of an array transducer having the whole size of D, R denotes a focal distance, sin θ denotes a steering angle, $t_0$ denotes a constant which is added to make the equation (1) have a positive value, and Z denotes a horizontal reference axis to measure the steering angle.

In the case that the whole size of the array transducer is small or a steering angle is small since an image point is positioned in a far distance, the equation (1) is approximated into the following equation (2).

$$\tau_x = \frac{R}{c}\left[\left\{\frac{1}{2}\left(\frac{x}{R}\right)^2 - \left(\frac{x}{R}\right)\sin\theta\right\}\right] + t_0 \quad (2)$$

According to the equation (2), the focusing delay is expressed as the following equation (3) and the steering delay is expressed as the following equation (4).

$$t_{focusing}(x) = \frac{x^2}{2cR} \quad (3)$$

$$t_{steering}(x, \theta) = \frac{x}{c}\sin\theta \quad (4)$$

Since the focusing delay and steering delay can be separated from each other, the ultrasound imaging system performs a focusing delay with respect to the received signal according to the equation (3) and then performs a steering delay, to thus deflect an ultrasound beam.

A method for obtaining a signal with respect to the deflected beam will be described in more detail. First, a signal returning from an image point is received in a channel or an element at a position x in FIG. 1, and then the signal having performed a focusing delay according to the equation (3) is assumed s(x,t). Next, in order to deflect an ultrasound beam in a direction of an angle θ, the signal having performed a steering delay is added to the signal s(x,t), so as to be then expressed as the following equation (5).

$$S(\theta,t)=\Sigma s(x,t-t_{steering}(x,\theta)) \quad (5)$$

Here, it is assumed that the complex signal s(x,t)=A(x,t) exp(jω0t) is modelled, and a complex amplitude A(x,t)≈A(x,t-$t_{steering}$(x)) since the steering angle is small, the equation (5) is approximated into the following equation (6).

$$S(\theta, t) = \sum s(x, t) \cdot \exp\left[-j\omega_0 \frac{x}{c}\sin\theta\right] \quad (6)$$

Therefore, the equation (6) having performed the steering delay is expressed as a spatial Fourier transform function with respect to the signals of all receipt channels having performed the focusing delay.

If a reflective object is positioned at a far distance and its steering angle is small, the signal received at each receipt element is represented as a different spatial frequency according to the direction in which a signal source is positioned. That is, if a sidelobe signal incident from a direction deflected by an angle θ from a mainlobe direction reaches a receipt element, the spatial frequency has the following equation (7).

$$f = \frac{D}{\lambda}\sin\theta \qquad (7)$$

Here, D denotes the whole size of an array transducer, λ. A denotes the wavelength of an ultrasound, and θ denotes an incident angle.

Figure 4A:
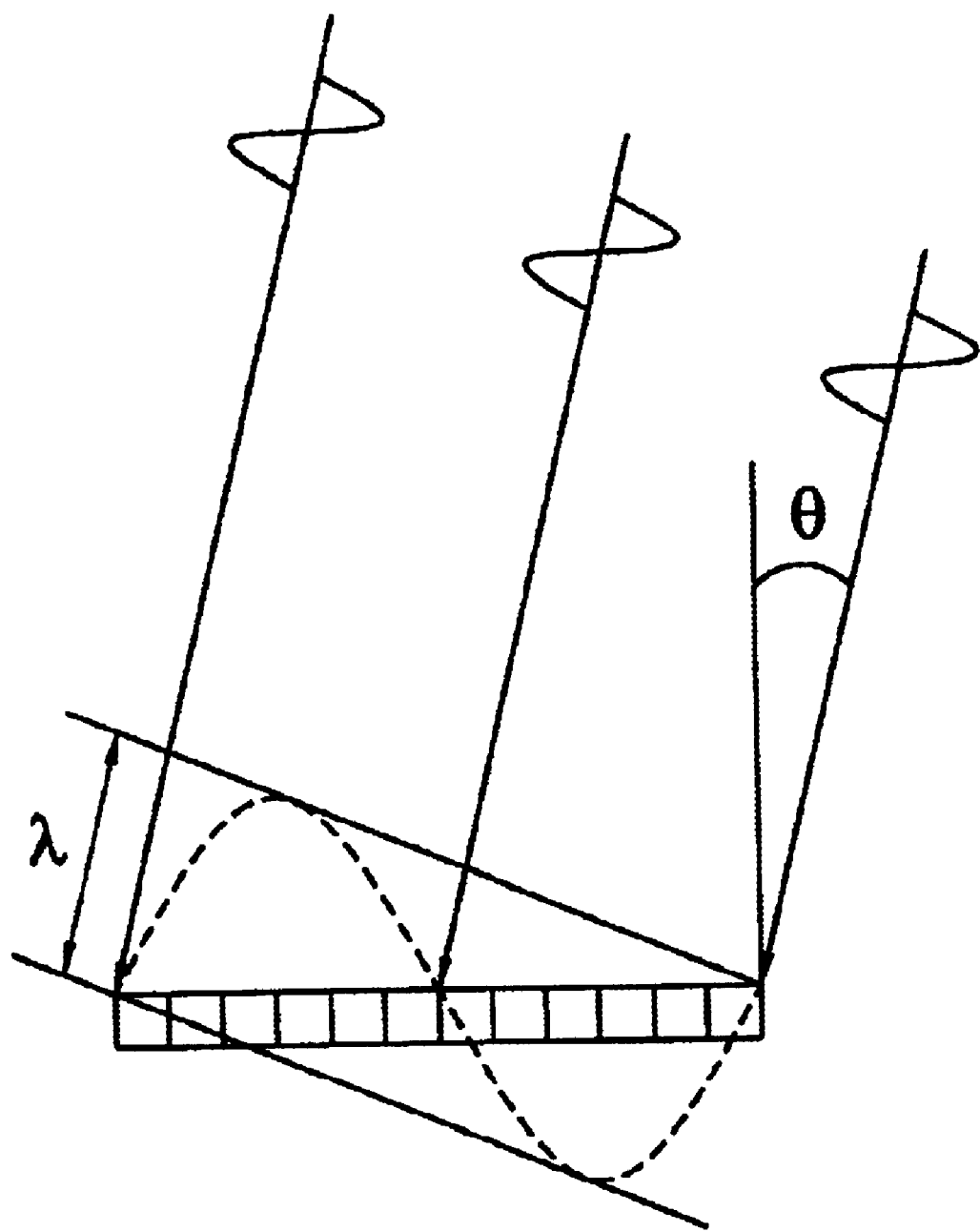
FIGS. 4A and 4B is a view showing a direction of an incident signal and a pattern of a received signal in the case that a spatial frequency f is one and two, respectively.
Figure 4B:
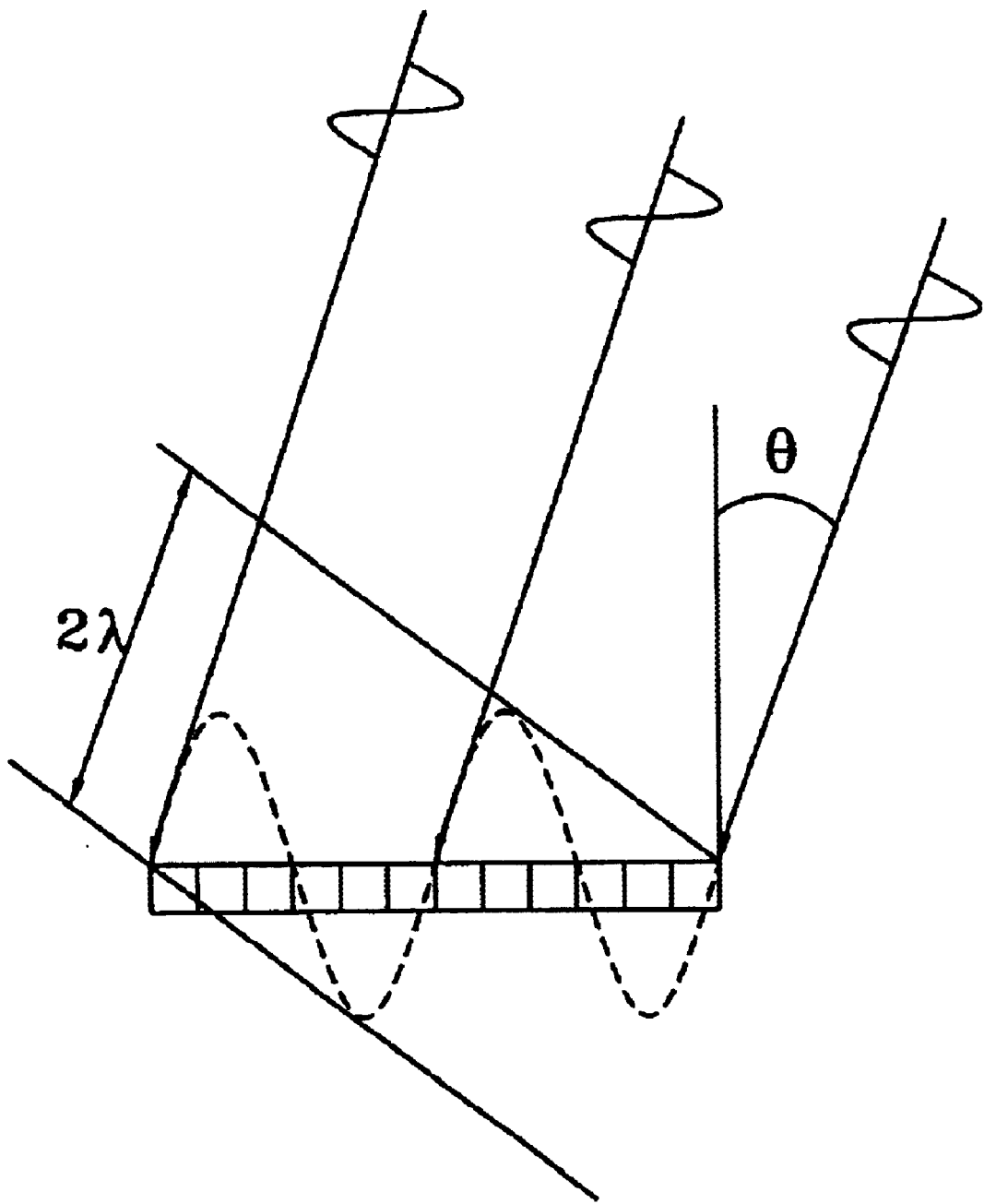

FIGS. 4(A) and 4(B) are a view showing a direction of an incident signal and a pattern of a received signal in the case that a spatial frequency f is one and two, respectively. In FIGS. 4(A) and 4(B), a mainlobe signal which is aligned in the same phase during receive focusing has a spatial frequency of f=0, and a sidelobe signal is represented as a spatial frequency which is not zero according to an incident angle. Here, if the spatial frequency f is an integer n where n is 1, 2, . . . , the signal received at the receipt element becomes a sine wave signal having the period of $2\pi$ n whose period is $2\pi$, $4\pi$, . . . . Thus, if the focusing signals are added, the magnitude becomes zero. Thus, the angle where the spatial frequency becomes an integer at an incident angle sin θ=fλ/D is an angle or direction where a null point appears in FIG. 2. Assuming that the whole size of the array transducer composed of N elements is D, and the position of each element x=kD/N, the above equation (6) by substitution of the equation (7) is transformed into the following equation (8).

$$S(f,t) = \sum s(x,t)\cdot\exp\left[-j2\pi f \frac{k}{N}\right] \qquad (8)$$

Thus, the deflection of the ultrasound beam is obtained by the spatial Fourier transform according to the equation (8). Each frequency coefficient becomes the magnitude of a signal component corresponding to a steering angle. In particular, if the spatial frequency f becomes an integer in equation (8), it looks as if a steering delay is performed in a null direction with respect to a perpendicular line on the plane of the element, which is made by a discrete Fourier transform.

Meanwhile, a transmission sound field and a reception sound field of the ultrasound imaging system having a rectangular transducer have a sine function characteristic, respectively. Therefore, when a distribution of the transmission sound field with respect to a directional angle θ is $F_{tx}(\theta)$ and a distribution of the reception sound field with respect to a directional angle θ is $F_{rx}(\theta)$, a transmission and reception sound field $F_{trx}(\theta)$ is expressed as the following equation (9).

$$F_{trx}(\theta) = F_{tx}(\theta)\cdot F_{rx}(\theta) \qquad (9)$$

A signal $S_{trx}(\theta)$ received in a transducer with respect to the transmission and reception sound field is expressed as product of the transmission and reception sound field $F_{trx}(\theta)$ and a reflectivity distribution r(θ) in a medium as the following equation (10).

$$S_{trx}(\theta) = \int F_{tx}(\theta)\cdot F_{rx}(\theta)\cdot r(\theta)d\theta \qquad (10)$$

Here, the sound field characteristic with respect to the directional angle means a sensitivity of the signal received in each direction. Thus, since the received signal $S_{trx}(\theta)$ includes all signal components which are reflected and received in a mainlobe direction and a sidelobe direction, it is difficult to tell signal components of each direction from each other. This will be described below in more detail.

Referring to FIG. 1, in the case that a point target A having a reflectivity r(0) in the mainlobe direction θ=0 exists and a point target B having a reflectivity $r(\theta_s)$ in the sidelobe direction θ=$\theta_s$ exists, a reflectivity function is expressed as the following equation (11).

$$r(\theta) = r(0)\,\delta(\theta) + r(\theta_s)\,\delta(\theta-\theta_s) \qquad (11)$$

Here, δ (θ) is a Dirac delta.

Therefore, in the case that a focusing direction of the transmission and reception sound field is a mainlobe direction, the signal S(0) received in the array element is expressed as the following equation (12).

$$S(0) = F_{tx}(0)\cdot F_{rx}(0)\cdot r(0) + F_{tx}(\theta_s)\cdot F_{rx}(\theta_s)\cdot r(\theta_s) \qquad (12)$$

In the equation (12), the first term is the component of the received signal in the mainlobe direction corresponding to an image and the second term is the component of the received signal in the sidelobe direction which lowers resolution of the image. If a transmission sound field is made θ=0 and a reception sound field is deflected by θ=$\theta_s$, in order to remove the signal component in the sidelobe direction, distribution of the reception sound field becomes $F_{rx}(\theta-\theta_s)$. Therefore, the received signal $S(\theta_s)$ by two targets is expressed as the following equation (13).

$$S(\theta_s) = F_{tx}(0)\cdot F_{rx}(-\theta_s)\cdot r(0) + F_{tx}(\theta_s)\cdot F_{rx}(0)\cdot r(\theta_s) \qquad (13)$$

Here, the magnitude of the first sidelobe adjacent the mainlobe in the sine function of the transmission and reception sound field is approximately 0.2 times that of the mainlobe. Therefore, considering the first sidelobe, the above-described equations (12) and (13) are expressed as the following equations (14) and (15), respectively.

$$S(0) = 1.0^2\cdot r(0) + 0.2^2\cdot r(\theta_s) \qquad (14)$$

$$S(\theta_s) = 1.0\cdot 0.2\cdot r(0) + 0.2\cdot 1.0\cdot r(\theta_s) \qquad (15)$$

Here, variables are r(0) and $r(\theta_s)$ in the equations (14) and (15).

Thus, if the equations (14) and (15) are extended in order to obtain the magnitude of the signal received in all the sidelobe directions of the ultrasound field, the received signal component in the sidelobe direction which influences an image point can be obtained. Here, it is assumed that reflectivity in all the sidelobe directions is a reflectivity at a discrete position. However, a convergence of simultaneous equations by the equations (14) and (15) is not guaranteed, and it is difficult to obtain the received signal component in the sidelobe direction in the case that a reflectivity and a sound field is a complex function.

Therefore, the present invention proposed a filtering method and apparatus for efficiently minimizing influences of at least one lateral direction signal component, that is, a sidelobe signal component, a gratinglobe signal component, or a null direction signal component, which lowers resolution of an ultrasound image among a received signal.

An ultrasound imaging system according to a preferred embodiment of the present invention separates at least one signal component which lowers resolution of an ultrasound image from a received signal of each element received with respect to each image point, using Fourier transform, and scales the magnitude of a signal focused in a direction corresponding to the image point according to a ratio occupied by a signal component such as a sidelobe signal component, a gratinglobe signal component or a null direction signal component, separated from the focusing signal.

In more detail, the focusing signal S(0) is obtained with respect to the mainlobe direction among the ultrasound field characteristics. Also, a signal $S(\theta_s)$ is obtained by performing a focusing-delay of an ultrasound beam and then performing a steering-delay of the ultrasound beam. In accordance with a ratio of the magnitude of $S(\theta)$ with respect to that of each obtained S(0), a signal S(0) focused with respect to an image point is rim scaled. That is, the magnitude of $S(\theta)$ which lowers resolution of an image is relatively larger than that of S(0) corresponding to an image value. scaling for reducing the magnitude and/or width of S(0) is performed. Therefore, the filtering according to the present invention outputs a focusing signal S(0) as an image value if there is no signal component $S(\theta)$ in a direction which lowers resolution of an image, from the focusing signal S(0) in the mainlobe direction corresponding to any one image point. Meanwhile, if a large target exists in a sidelobe direction, a null direction or a gratinglobe direction adjacent any one image point and a signal component $S(\theta)$ corresponding to the large target is included in the focusing signal S(0), filtering is performed in order to reduce the magnitude and/or width of the focusing signal according to the ratio of the signal component with respect to the focusing signal, to thereby remarkably enhance resolution of an image.

Meanwhile, as shown in FIG. 2, in the case that a mainlobe direction corresponds to an angle zero among the ultrasound field characteristics, the sidelobe direction is approximately distributed in discrete pattern in the angular direction of $(\theta_s) \approx \pm(n+0.5)\lambda/D$, where n is a positive integer, and the null direction is distributed in discrete pattern in the angular direction of $\sin(\theta_{null})=\pm n\lambda/D$. The gratinglobe is generated due to a signal incident in the angular direction of $\sin(\theta_g)=\lambda/d$.

Therefore, a method for filtering a focusing signal S(0) corresponding to an image point according to a signal component $S(\theta_s)$ in a sidelobe direction uses the following equation (16).

$$S_{filtered} = \frac{S(0)}{1 + \frac{S(\theta_s)}{S(0)}} = \frac{S(0)^2}{S(0) + S(\theta_s)} \quad (16)$$

Here, S(0) and $S(\theta_s)$ are obtained using Fourier transform. Since S(0) is a signal obtained by focusing all channel signals which have not been steering delayed, S(0) is same as an image value of a B-mode brightness in the existing ultrasound imaging system. Also, $S(\theta_s)$ is obtained by using the Fourier transform of the equation (6). Thus, the magnitude of the received signal $S(\theta_s)$ in all the sidelobe directions shown in FIG. 2 is obtained by a root mean square formula, and the obtained value is defined as $S_{sidelobe}$ as in the following equation (17).

$$S_{sidelobe} = \sqrt{\sum_{\theta_s} |S(\theta_s)^2|} \quad (17)$$

If the magnitude and focal distance of the transmission and reception elements are known, a directional angle where a sidelobe travels in the ultrasound field can be known in advance. Thus, the signal components received from all sidelobe directions $\sin(\theta_s) \approx \pm(n+0.5)\lambda/D$ are obtained using the equation (17), and the equation (16) is expressed again as the following equation (18), in order to minimize influences of the sidelobe signal component in the focusing signal.

$$S_{S_{filtered}} = FILTER[s(x_0), s(x_1), \ldots, s(x_{N-1})] = \frac{S(0)}{1 + \gamma_s \cdot \frac{S_{sidelobe}}{S(0)}} \quad (18)$$

Here, $\gamma_s$ is a scale factor having a real value. Also, a filter for performing a filtering according to the equation (18) in the present invention is defined as a sidelobe reduction filter.

In general, a medium in a random scattering body such as a human body is distributed in a non-uniform pattern. Thus, since the magnitude $S_{sidelobe}$ of the received signal in the sidelobe direction is not zero in any time, the signal obtained by being filtered according to the equation (18) is always smaller compared with S(0) in its magnitude and/or width, to thereby enhance an image contrast. In particular, as the sidelobe signal component is larger, the resolution of the ultrasound image adopting the sidelobe reduction filter according to the present invention is much more remarkably enhanced.

Meanwhile, an actual sidelobe signal is estimated that the magnitude of the signal is small owing to a directivity of the element. Thus, it is more effective to consider only a sidelobe direction adjacent the mainlobe direction in implementing a sidelobe reduction filter. The number of the sidelobes used for the filter structure is defined as an order number of filter. In the case that a filter order is one, the sidelobe reduction filter according to the present invention uses only sidelobe signal components received in the sidelobe direction $\sin(\pm\theta_s)=\pm1.5\lambda/D$. In the case that the filter order is two, the sidelobe reduction filter uses only sidelobe signal components received in the sidelobe direction $\sin(\theta_s)=\pm1.5\lambda/D, \pm2.5\lambda/D$. As described above, if the sidelobe direction is properly restricted, Fourier transform with respect to the sidelobe signal components in all directions need not be calculated. As a result, a complexity of calculation is simplified and an amount of calculation is reduced. In addition, an error owing to the signal component of the sidelobe direction excluded in the calculation is solved by adjusting a scale factor value $\gamma_s$ properly. Therefore, as described above, if only a substantially necessary sidelobe signal component is calculated, filtering according to the equation (18) can be performed in real time without modifying the existing ultrasound focusing system largely, and remarkably improves resolution of an ultrasound image.

Hereinbelow, a filter for reducing an influence of a received signal in a null direction which is called a null reduction filter will be described. The null reduction filter is implemented by modifying the sidelobe reduction filter according to the equation (18) properly.

The null direction shown in FIG. 2 corresponds to the direction where the magnitude of a reflective signal is minimum among the lateral direction sound filed characteristics. However, if an ultrasound field is degraded due to a phase aberration, a signal component corresponding to a null direction is increased to affect resolution of an image greatly. Since the null direction in FIG. 2 is discretely distributed in the angular direction of $\sin(\theta_{null})=\pm n\lambda/D$, the magnitude $S_n$ of a signal $S(\theta_n)$ corresponding to the null direction is obtained using the following equation (19) considering the equation (6) and FIG. 2.

$$S_n = \sqrt{\sum_{\theta_n} |S(\theta_n)^2|} \qquad (19)$$

If the equation (18) is adaptively modified according to the equation (19), the null reduction filtering method is expressed as the following equation (20).

$$S_{n_{filtered}} = \frac{S(0)}{1 + \gamma_n \cdot \frac{S_n}{S(0)}} \qquad (20)$$

Here, $\gamma_n$ is a scale factor having a real value.

In general, since the magnitude of the received signal in the null direction is very small, the filtered signal by the null reduction filtering method according to the equation (20) does not affect resolution of an original image nearly in the case that transmission and reception focusing is smoothly performed. However, in the case that the transmission sound field is modified by a sound velocity, refraction, diffraction, reflection, scattering and attenuation in a medium, and thus sound field characteristics are changed, or in the case that the medium is distributed in a non-uniform way, the magnitude of the null direction received signal is increased. In the case that the magnitude of the null direction received signal is increased in this way, a focusing signal is filtered according to a ratio between the magnitudes of the received signals S(0) and $S_{null}$. As a result, resolution of an image can be enhanced further than in the sidelobe reduction filter. Also, in the case that the magnitude of the null direction received signal is increased, the magnitudes of the received signals S(0) and $S_{null}$ are compared, the comparison result can used as parameters for measuring distribution of a scattering body, magnitude of phase aberration, and degree of transmission focusing.

Next, a filter for reducing an influence of the received signal in a gratinglobe direction which will be called a gratinglobe reduction filter, will be described. The gratinglobe reduction filter is implemented by properly modifying the sidelobe reduction filter according to the equation (18). The gratinglobe is generated owing to a signal component incident in an angular direction of $\sin(\theta_g) = \lambda/d$. The signal component also lowers resolution of an image. Thus, if a direction of a reception sound field with respect to that of a transmission sound field, that is, a gratinglobe direction is set as $\theta_g = \sin^{-1}(\lambda/d)$, the magnitude $S_{grating}$ of the gratinglobe signal component is obtained as in the following equation (21) and the focusing signal can be scaled according to a ratio of the received signals as in the following equation (22).

$$S_{grating} = |S(\theta_g)| \qquad \ldots (21)$$

$$S_{g_{filtered}} = \frac{S(0)}{1 + \gamma_g \cdot \frac{S_{grating}}{S(0)}} \qquad (22)$$

Here, $\gamma_g$ is a scale factor having a real value.

Thus, the present invention employs the above-described sidelobe reduction filter, and/or null reduction filter, and/or the gratinglobe reduction filter without greatly modifying the structure of the existing ultrasound imaging system for ultrasound image, to thereby provide an effect of greatly improving resolution of an ultrasound image in real time.

Figure 5:
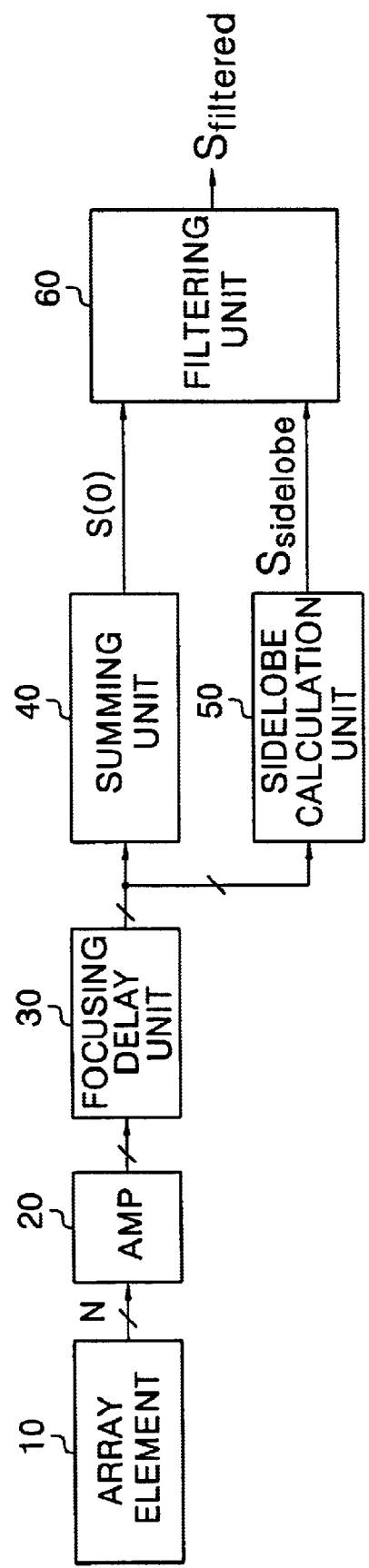
FIG. 5 is a block diagram showing an ultrasound system to which a filtering method for improving resolution of an ultrasound image is employed, according to the present invention.

FIG. 5 is a block diagram showing an ultrasound focusing system to which a filtering method for improving resolution of an ultrasound image is employed, according to the present invention. The ultrasound focusing system receives a reflective signal with respect to an image point in each array element 10 of a transducer. An amplifier (AMP) 20 amplifies each received signal and outputs the amplified result. A focusing delay unit 30 applies a focusing delay time adaptively to each N channel signal and aligns the phase identically. A summing unit 40 sums each focusing delayed channel signal and outputs a focusing signal S(0). Meanwhile, a sidelobe calculation unit 50 obtains the magnitude of a sidelobe signal component according to the equation (17), and/or the magnitude of a null signal component according to the equation (19), and/or the magnitude of a signal component according to the equation (21). Subsequently, a filtering unit 60 performs sidelobe reduction filtering according to the equation (18), and/or null reduction filtering according to the equation (20), and/or gratinglobe reduction filtering according to the equation (22), using the values output from the summing unit 40 and the sidelobe calculation unit 50, and outputs the filtered signal $S_{filtered}$ as an image value.

Here, the sidelobe reduction filter, the null reduction filter and the gratinglobe reduction filter can be employed in the existing ultrasound focusing system selectively. In the case that at least two filters are employed, such a filtering can be performed stepwise.

As described above, the present invention Fourier-transforms each received channel signal in discrete form in lateral direction with respect to a mainlobe direction, and thus obtains the magnitude of a corresponding lateral direction signal component. Then, the present invention filters the focused signal according to a ratio of the lateral direction signal component with respect to the focused signal in the mainlobe direction, to thereby minimize an influence of the signal components which lower resolution of an image. Thus, the present invention performs a filtering using parallel operation and Fourier transform of the small number of order in real time without greatly modifying the existing system, to thereby greatly improve resolution of an ultrasound image. Also, the present invention further does not need prior information with respect to a medium or a separate assumption and provides an effect of performing the above filtering in order to improve resolution of the ultrasound image adaptively to a sound characteristic varying according to the depth of the image on the basis of the ultrasound field characteristics of the array transducer.

Meanwhile, a number of modifications which have not be described in the specification can be implemented in the technological scope of the present invention, which is apparent to those having an ordinary skill in the art who understands the technological concepts and the above embodiment of the present invention.

What is claimed is:

1. A filtering method for improving resolution of an ultrasound image in an ultrasound imaging system, the filtering method comprising the steps of:

(a) obtaining magnitude of at least one lateral direction signal component among ultrasound field characteristics which lowers resolution of an image, using Fourier transform wherein said at least one lateral direction signal component includes a sidelobe signal component, a gratinglobe signal component, and a null direction signal component; and (b) scaling a signal focused in a mainlobe direction according to a ratio between the magnitude of the lateral direction signal component obtained in said step (a) and that of the signal focused in the mainlobe direction.

2. The filtering method of claim 1, wherein the signal component corresponding to the sidelobe direction is a lateral direction signal component corresponding to the direction of $\sin(\theta_s) \approx \pm(n+0.5)\lambda/D$, the signal component corresponding to the null direction is a signal component corresponding to the direction of $\sin(\theta_n) = \pm n\lambda/D$, and the signal component corresponding to the gratinglobe direction is a signal component corresponding to the direction of $\sin(\theta_g) = \lambda/d$, where n is a positive integer, $\lambda$ is the wavelength of an ultrasound, D is the whole size of an array transducer, and d is the size of one element of the array transducer.

3. The filtering method of claim 1, wherein said step (a) obtains the lateral direction signal component from each channel signal which has been delayed for focusing in the mainlobe direction corresponding to an image point and identically phase-aligned.

4. The filtering method of claim 1, wherein said step (b) scales the magnitude and/or width of the signal focused in the mainlobe direction corresponding to an image point.

5. The filtering method of claim 1, wherein said step (a) obtains the magnitude of the signal component using the following equation $$S_{sidelobe} = \sqrt{\sum_{\theta_s} |S(\theta_s)^2|}$$

in the case that the lateral direction signal component desired to be obtained is a signal component $S(\theta_s)$ corresponding to the sidelobe direction $\theta_s$, and wherein said step (b) filters a signal S(0) focused in the mainlobe direction according to the following equation $$S_{s\,filtered} = \frac{S(0)}{1 + \gamma_s \cdot \frac{S_{sidelobe}}{S(0)}}$$

wherein $S(\theta_s)$ and S(0) are obtained using Fourier transform and $\gamma_s$ is a scale factor.

6. The filtering method of claim 5, wherein said signal S(0) is the same as an image value of a B-mode brightness in the ultrasound imaging system.

7. The filtering method of claim 5, wherein said $S(\theta^s)$ and S(0) are obtained using the following equation $$S(\theta, t) = \sum s(x, t) \cdot \exp\left[-j\omega_0 \frac{x}{c} \sin\theta\right]$$

in which $\theta$ denotes an angle in a lateral direction deflected on the basis of the mainlobe direction, x denotes a distance from the center of a transducer to the received position, c denotes an ultrasound velocity, and $S(\theta_s)$ is approximately a signal component corresponding to an angular direction of $\sin(\theta_g) \approx \pm(n+0.5)\lambda/D$.

8. The filtering method of claim 1, wherein said step (a) obtains the magnitude of the signal component using the following equation $$S_n = \sqrt{\sum_{\theta_n} |S(\theta_n)^2|}$$

in the case that the lateral direction signal component desired to be obtained is a signal component $S(\theta_n)$ corresponding to the null direction $\theta_{null}$, and wherein said step (b) filters a signal S(0) according to the following equation $$S_{n\,filtered} = \frac{S(0)}{1 + \gamma_n \cdot \frac{S_n}{S(0)}}$$

wherein $S(\theta_s)$ and S(0) are obtained using Fourier transform and $\gamma_n$ is a scale factor.

9. The filtering method of claim 8, wherein said $S(\theta_n)$ and S(0) are obtained using the following equation $$S(\theta, t) = \sum s(x, t) \cdot \exp\left[-j\omega_0 \frac{x}{c} \sin\theta\right]$$

in which $\theta$ denotes an angle in a lateral direction deflected on the basis of the mainlobe direction, x denotes a distance from the center of the transducer to the received position, c denotes an ultrasound velocity, and $S(\theta_n)$ is approximately a signal component corresponding to an angular direction of $\sin(\theta_n) = n\lambda/D$.

10. The filtering method of claim 1, wherein said step (a) obtains the magnitude of the signal component using the following equation $$S_{grating} = \sqrt{\sum_{\theta_g} |S(\theta_g)^2|}$$

in the case that the lateral direction signal component desired to be obtained is a signal component corresponding to the gratinglobe direction $\theta_{gratinglobe}$ and wherein said step (b) filters a signal S(0) according to the following equation $$S_{g\,filtered} = \frac{S(0)}{1 + \gamma_g \cdot \frac{S_{grating}}{S(0)}}$$

wherein $S(\theta_s)$ and S(0) are obtained using Fourier transform and $\gamma_g$ is a scale factor.

11. The filtering method of claim 10, wherein said $S(\theta_g)$ and S(0) are obtained using the following equation $$S(\theta, t) = \sum s(x, t) \cdot \exp\left[-j\omega_0 \frac{x}{c} \sin\theta\right]$$

in which $\theta$ denotes an angle in a lateral direction deflected on the basis of a mainlobe direction, x denotes a distance from the center of the transducer element to the received position, c denotes an ultrasound velocity, and $S(\theta_g)$ is approximately a signal component corresponding to an angular direction of $\sin(\theta_g) = \lambda/d$.

12. A filtering apparatus for improving resolution of an ultrasound image in an ultrasound imaging system, the filtering apparatus comprising:

a lateral direction signal calculator for obtaining magnitude of at least one lateral direction signal component among ultrasound field characteristics which lowers resolution of an image, using Fourier transform wherein said at least one lateral direction signal component includes a sidelobe signal component, a gratinglobe signal component, and a null direction signal component; and a filtering unit for scaling a signal focused in a mainlobe direction according to a ratio between the magnitude of the lateral direction signal component obtained in the lateral direction signal calculator and that of the signal focused in the mainlobe direction.

13. The filtering apparatus of claim 12, further comprising a focusing delay unit for aligning each signal received from each array element with respect to a mainlobe direction in the same phase; and a summing unit for summing each signal aligned in the same phase in said focusing delay unit and outputting the summed result to said filtering unit, wherein said lateral direction signal calculator calculates the magnitude of said lateral direction signal component from each signal aligned in the same phase in said focusing delay unit.

14. The filtering apparatus of claim 12, wherein the signal component corresponding to the sidelobe direction is a lateral direction signal component corresponding to the direction of $\sin(\theta_s) \approx \pm(n+0.5)\lambda/D$, the signal component corresponding to the null direction is a signal component corresponding to the direction of $\sin(\theta_n) = \pm n\lambda/D$, and the signal component corresponding to the gratinglobe direction is a signal component corresponding to the direction of $\sin(\theta_g) = \lambda/d$, where n is a positive integer, $\lambda$ is the wavelength of an ultrasound image, D is the whole size of an array transducer, and d is the size of one element of the array transducer.

15. The filtering apparatus of claim 14, wherein said lateral direction signal calculator obtains the magnitude of the signal component using the following equation $$S_{sidelobe} = \sqrt{\sum_{\theta_s} |S(\theta_s)^2|}$$

in the case that the lateral direction signal component desired to be obtained is a signal component $S(\theta_s)$ corresponding to the sidelobe direction $\theta_s$, and wherein said filtering unit filters a signal S(0) focused in the mainlobe direction according to the following equation $$S_{s\,filtered} = \frac{S(0)}{1 + \gamma_s \cdot \frac{S_{sidelobe}}{S(0)}}$$

wherein $S(\theta_s)$ and $S(0)$ are obtained using Fourier transform and $\gamma_s$ is a scale factor.

16. The filtering apparatus of claim 14, wherein said lateral signal calculator obtains the magnitude of the signal component using the following equation $$S_n = \sqrt{\sum_{\theta_n} |S(\theta_n)^2|}$$

in the case that the lateral direction signal component desired to be obtained is a signal component $S(\theta_n)$ corresponding to the null direction $\theta_{null}$, and wherein said filtering unit filters a signal S(0) according to the following equation $$S_{n\,filtered} = \frac{S(0)}{1 + \gamma_n \cdot \frac{S_n}{S(0)}}$$

wherein $S(\theta_n)$ and $S(0)$ are obtained using Fourier transform and $\gamma_s$ is a scale factor.

17. The filtering apparatus of claim 14, wherein said lateral signal calculator obtains the magnitude of the signal component using the following equation $$S_{grating} = \sqrt{\sum_{\theta_g} |S(\theta_g)^2|}$$

in the case that the lateral direction signal component desired to be obtained is a signal component corresponding to the gratinglobe direction $\theta_{gratinglobe}$ and wherein said filtering unit filters a signal S(0) according to the following equation $$S_{g\,filtered} = \frac{S(0)}{1 + \gamma_g \cdot \frac{S_{grating}}{S(0)}}$$

wherein $S(\theta_g)$ and $S(0)$ are obtained using Fourier transform and $\gamma_g$ is a scale factor.

18. The filtering apparatus of claim 12, wherein said filtering unit scales the magnitude and/or width of the signal focused in the mainlobe direction corresponding to an image point.

* * * * *